US011670782B2

(12) United States Patent
Morikawa et al.

(10) Patent No.: US 11,670,782 B2
(45) Date of Patent: Jun. 6, 2023

(54) FUEL CELL SEPARATOR AND FUEL CELL STACK

(71) Applicants: HONDA MOTOR CO., LTD., Tokyo (JP); KOKOKU INTECH CO., LTD., Tokyo (JP)

(72) Inventors: Hiroshi Morikawa, Wako (JP); Keisuke Ando, Wako (JP); Akihiro Noda, Wako (JP); Koji Hirayama, Tokyo (JP); Keisuke Mori, Tokyo (JP); Hirotoshi Honma, Saitama-ken (JP)

(73) Assignees: Honda Motor Co., Ltd., Tokyo (JP); Kokoku Intech Co., Ltd., Tokyo (JP)

( * ) Notice: Subject to any disclaimer, the term of this patent is extended or adjusted under 35 U.S.C. 154(b) by 0 days.

(21) Appl. No.: 17/559,236

(22) Filed: Dec. 22, 2021

(65) Prior Publication Data

US 2022/0216486 A1 Jul. 7, 2022

(30) Foreign Application Priority Data

Jan. 5, 2021 (JP) ............................. JP2021-000557

(51) Int. Cl.
| H01M 8/04 | (2016.01) |
| H01M 8/0267 | (2016.01) |
| H01M 8/028 | (2016.01) |
| H01M 8/0276 | (2016.01) |
| H01M 8/026 | (2016.01) |

(52) U.S. Cl.
CPC ......... *H01M 8/0267* (2013.01); *H01M 8/026* (2013.01); *H01M 8/028* (2013.01); *H01M 8/0276* (2013.01)

(58) Field of Classification Search
CPC .. H01M 8/0267; H01M 8/026; H01M 8/0276; H01M 8/028
See application file for complete search history.

(56) References Cited

U.S. PATENT DOCUMENTS

| 2019/0074524 A1* | 3/2019 | Tomana ................. H01M 8/026 |
| 2019/0131637 A1* | 5/2019 | Goto .................... H01M 8/0273 |

FOREIGN PATENT DOCUMENTS

JP 2019-046755 A 3/2019

* cited by examiner

*Primary Examiner* — Olatunji A Godo
(74) *Attorney, Agent, or Firm* — Carrier Shende & Associates, P.C.; Joseph P. Carrier; Jeffrey T. Gedeon

(57) ABSTRACT

A fluid flow field of a separator of a fuel cell stack allows a fluid to flow in a separator surface direction. A rubber seal member provides a seal between the fluid passage and the fluid flow field. The tunnel portion intersects the rubber seal member at an intersection. The tunnel portion allows the fluid flow field and the fluid passage to connect to each other. In the rubber seal member, a first portion protrudes from a flat portion in a stacking direction, and a second portion protrudes from a protruding end surface of a tunnel portion in the stacking direction.

9 Claims, 9 Drawing Sheets

FUEL CELL SEPARATOR AND FUEL CELL STACK

CROSS-REFERENCE TO RELATED APPLICATIONS

This application is based upon and claims the benefit of priority from Japanese Patent Application No. 2021-000557 filed on Jan. 5, 2021, the contents of which are incorporated herein by reference.

BACKGROUND OF THE INVENTION

Field of the Invention

The present invention relates to a fuel cell separator and a fuel cell stack.

Description of the Related Art

Generally, fuel cells are used in the form of a fuel cell stack. The fuel cell stack includes a cell stack body and end plates. The cell stack body is formed by stacking a plurality of power generation cells (unit fuel cells). The end plates are disposed at both ends of the cell stack body in the stacking direction. A power generation cell is formed by sandwiching a membrane electrode assembly between a pair of separators. Further, a compression load (fastening load) is applied to the power generation cells in the stacking direction via the end plates.

In this type of fuel cell separator, a fluid flow field is formed. The fluid flow field allows a reactant gas (an oxygen-containing gas or a fuel gas) to flow and to be supplied to the membrane electrode assembly. Alternatively, the fluid flow field allows a coolant for cooling the power generation cell or the like to flow. An outer area is disposed outside the fluid flow field in a plane direction of the separator. A plurality of fluid passages are formed in the outer area. Each of the fluid passages penetrates the power generation cell in the stacking direction of the power generation cells. Each of the fluid passages allows any one of the oxygen-containing gas, the fuel gas, and the coolant to flow.

For example, as disclosed in JP 2019-046755 A, a separator provided with a bead seal is known. The bead seal seals between the fluid flow field and each of the fluid passages, thereby preventing leakage or mixing of the fluids. The separator includes a tunnel portion and a bead seal. For example, in a case where a fluid flow field for the oxygen-containing gas is formed in the separator, the bead seal seals between the fluid flow field and the fluid passage for the oxygen-containing gas. The tunnel portion intersects the bead portion at an intersection. Since the fluid flow field for the oxygen-containing gas and the fluid passage for the oxygen-containing gas are connected to each other by the tunnel portion, only the oxygen-containing gas can flow between the fluid flow field for the oxygen-containing gas and the fluid passage for the oxygen-containing gas. The intersections of the bead seal and the tunnel portion are similarly provided between the fluid flow field for the fuel gas and the fluid passage for the fuel gas and between the fluid flow field for the coolant and the fluid passage for the coolant.

Each of the bead seal and the tunnel portion is formed by providing a protruding shape on a metal separator by press forming or the like. In the power generation cell, the protruding end surface of the bead seal abuts against an abutment object such as a membrane electrode assembly adjacent to the protruding end surface. Therefore, when the compression load is applied to the bead seal, the bead seal is pressed by the abutment object and elastically deformed. As a result, good seal performance by the bead seal is ensured. A space formed inside the protruding shape of the tunnel portion serves as a connection channel through which a fluid flows. The tunnel portion allows the fluid flow field and the fluid passage corresponding to each other to connect to each other via the connection channel.

SUMMARY OF THE INVENTION

In the above-described separator, it is preferable for the bead seal to be elastically deformable by a compression load sufficiently. This is because it is desired to achieve good seal performance between the fluid flow field and the fluid passage by the bead seal. On the other hand, the tunnel portion is preferably prevented from being elastically deformed even when a compression load is applied thereto, so that the cross-sectional area of the inner connection channel can be maintained at a sufficient size. This is because it is desired to allow the fluid to flow in a favorable manner between the fluid flow field and the fluid passage which correspond to each other.

However, both the bead seal and the tunnel portion are formed by deforming a part of the separator. Therefore, the intersection between the bead seal and the tunnel portion has an integrally protruding shape in which the bead seal and the tunnel portion are continuously formed. In such a bead seal, rigidity is higher in the intersection and its vicinity than in other portions that do not intersect the tunnel portion. For this reason, there is a concern that the intersection of the bead seal and its vicinity are less likely to be elastically deformed than other portions that do not intersect the tunnel portion. As a result, there is a concern that seal performance between the fluid flow field and the fluid passage may be deteriorated. On the other hand, in the tunnel portion, there is a concern that the intersection and its vicinity may be more likely to be elastically deformed in a direction in which the cross-sectional area of the inner connection channel is reduced than in other portions that do not intersect the bead seal. As a result, there is a concern that it may be difficult for the fluid to flow in the tunnel portion in a favorable manner.

An object of the present invention is to solve the above-described problems.

According to an aspect of the present invention, a fuel cell separator stacked on a membrane electrode assembly, a compression load being applied to the fuel cell separator in a stacking direction, is provided. The fuel cell separator includes a fluid flow field configured to allow a fluid that is any of an oxygen-containing gas, a fuel gas, and a coolant to flow in a separator surface direction, a fluid passage that penetrates in the stacking direction an outer area disposed outside the fluid flow field in the separator surface direction and is configured to allow the fluid to flow in the stacking direction, a rubber seal member configured to provide a seal between the fluid flow field and the fluid passage, and a tunnel portion that has a hollow shape protruding in the stacking direction from a flat portion provided in the outer area, extends so as to intersect the rubber seal member at an intersection, and forms inside a connection channel configured to connect the fluid flow field and the fluid passage, wherein the rubber seal member is a member different from the tunnel portion and includes a first portion and a second portion that extend continuously with each other, the first portion protrudes in the stacking direction from the flat portion, and the second portion protrudes in the stacking direction from a protruding end surface of the tunnel portion disposed at the intersection.

Another aspect of the present invention is a fuel cell stack in which the plurality of fuel cell separators and the plurality of membrane electrode assemblies are arranged in the stacking direction.

In this fuel cell separator, the rubber seal member and the tunnel portion are formed of different members. For this reason, in the intersection to which the compression load is applied, for example, compared to a case where the rubber seal member and the tunnel portion are continuously formed of the same member, it is possible to it is possible to prevent the rubber seal member and the tunnel portion from being elastically deformed together or integrally.

That is, in the rubber seal member, it is possible to elastically deform the rubber seal member sufficiently by the compression load to achieve good seal performance between the fluid flow field and the fluid passage. On the other hand, in the tunnel portion, even if a compression load is applied, it is possible to maintain a shape in which a connection channel having a sufficient cross-sectional area is formed inside, and to allow a fluid to flow between the fluid flow field and the fluid passage in a favorable manner.

As described above, according to the fuel cell separator and the fuel cell stack including the fuel cell separator of the present invention, it is possible to achieve good seal performance between the fluid flow field and the fluid passage, and to allow a fluid to flow through the connection channel in the tunnel portion in a favorable manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

In the following drawings, components having the same or similar functions and effects are denoted by the same reference numerals, and repeated description thereof may be omitted.

Figure 1:
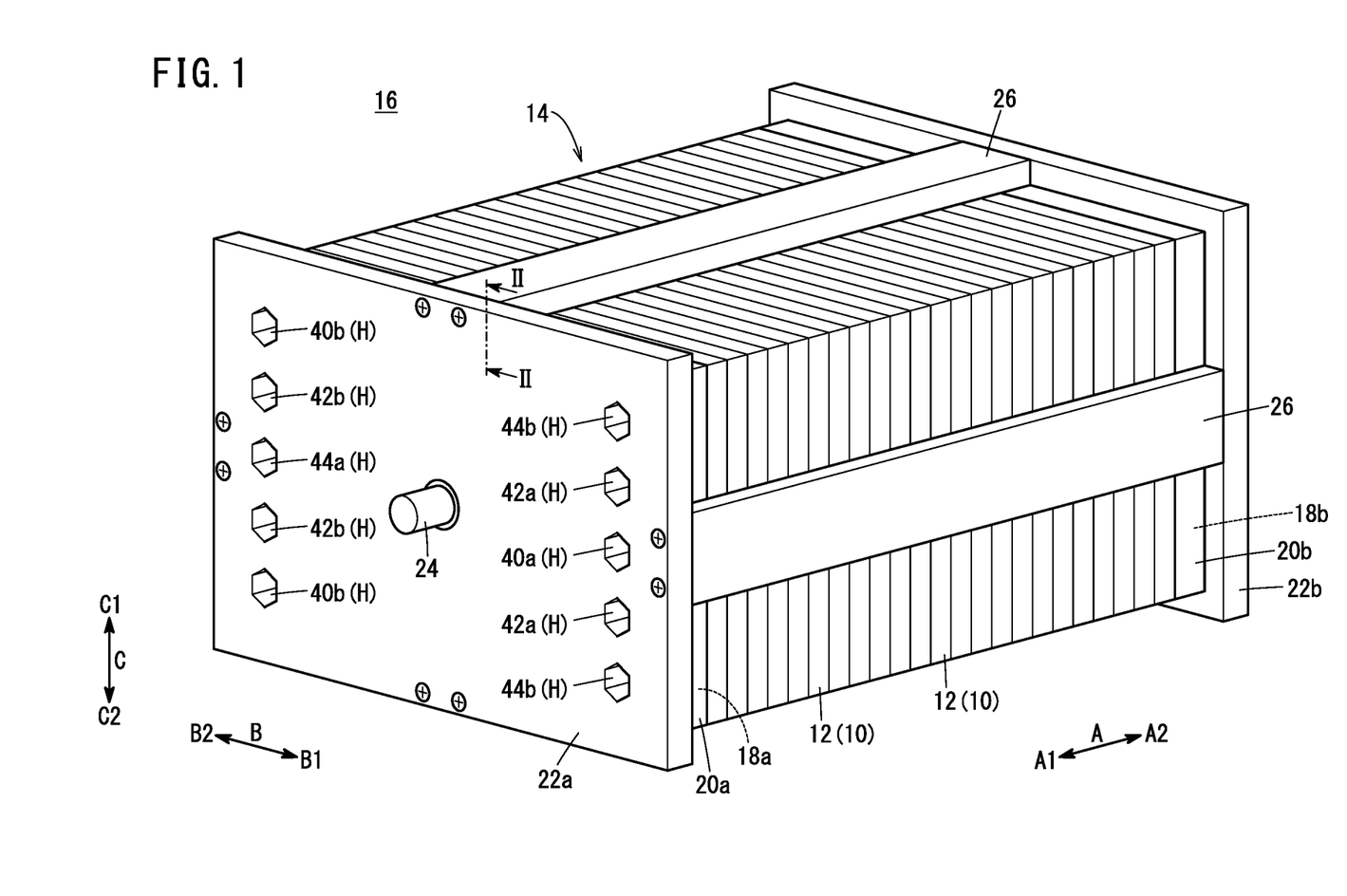
FIG. 1 is a perspective view of a fuel cell stack.
Figure 2:
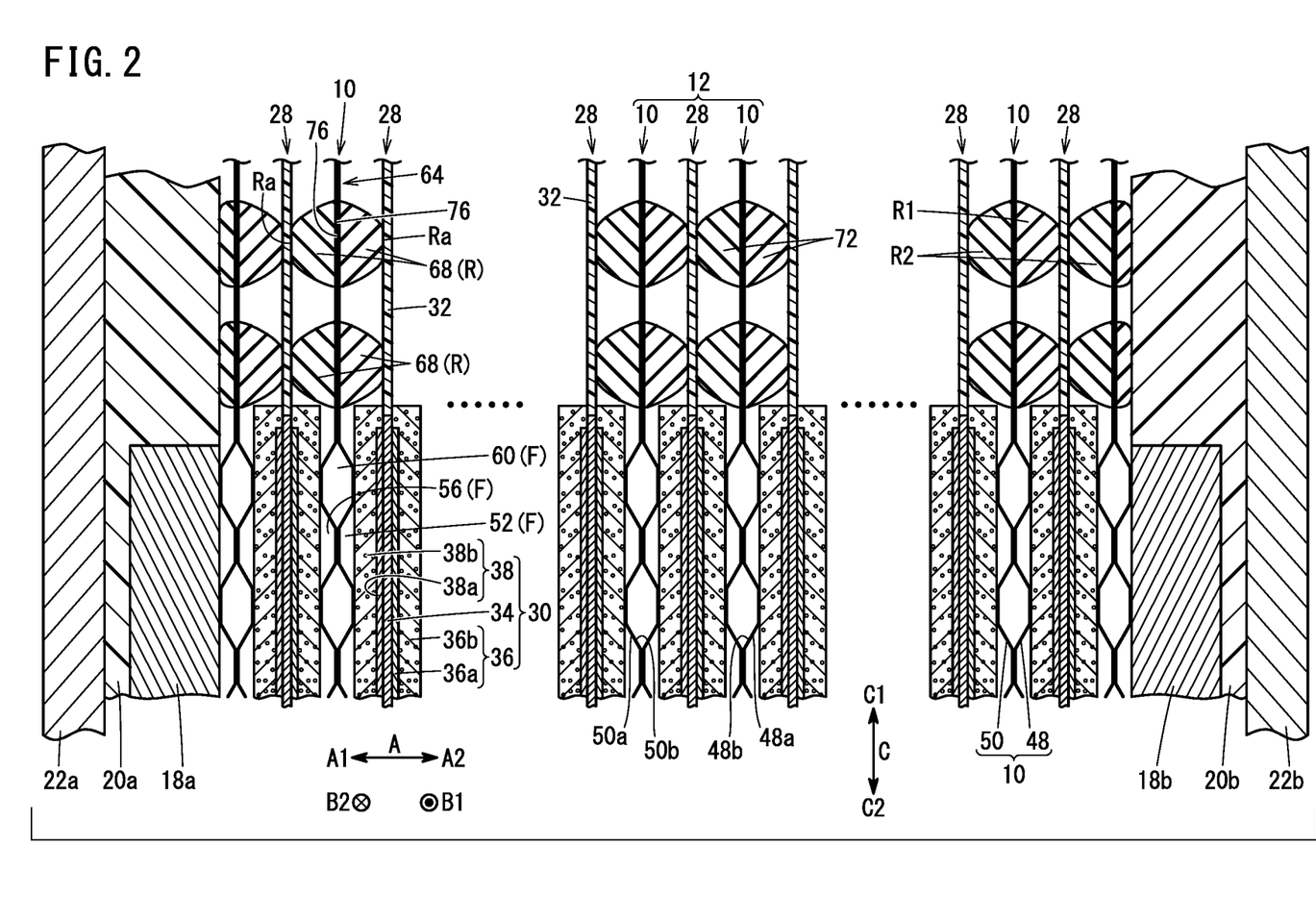
FIG. 2 is a partial cross-sectional view taken along line II-II of FIG. 1.
Figure 3:
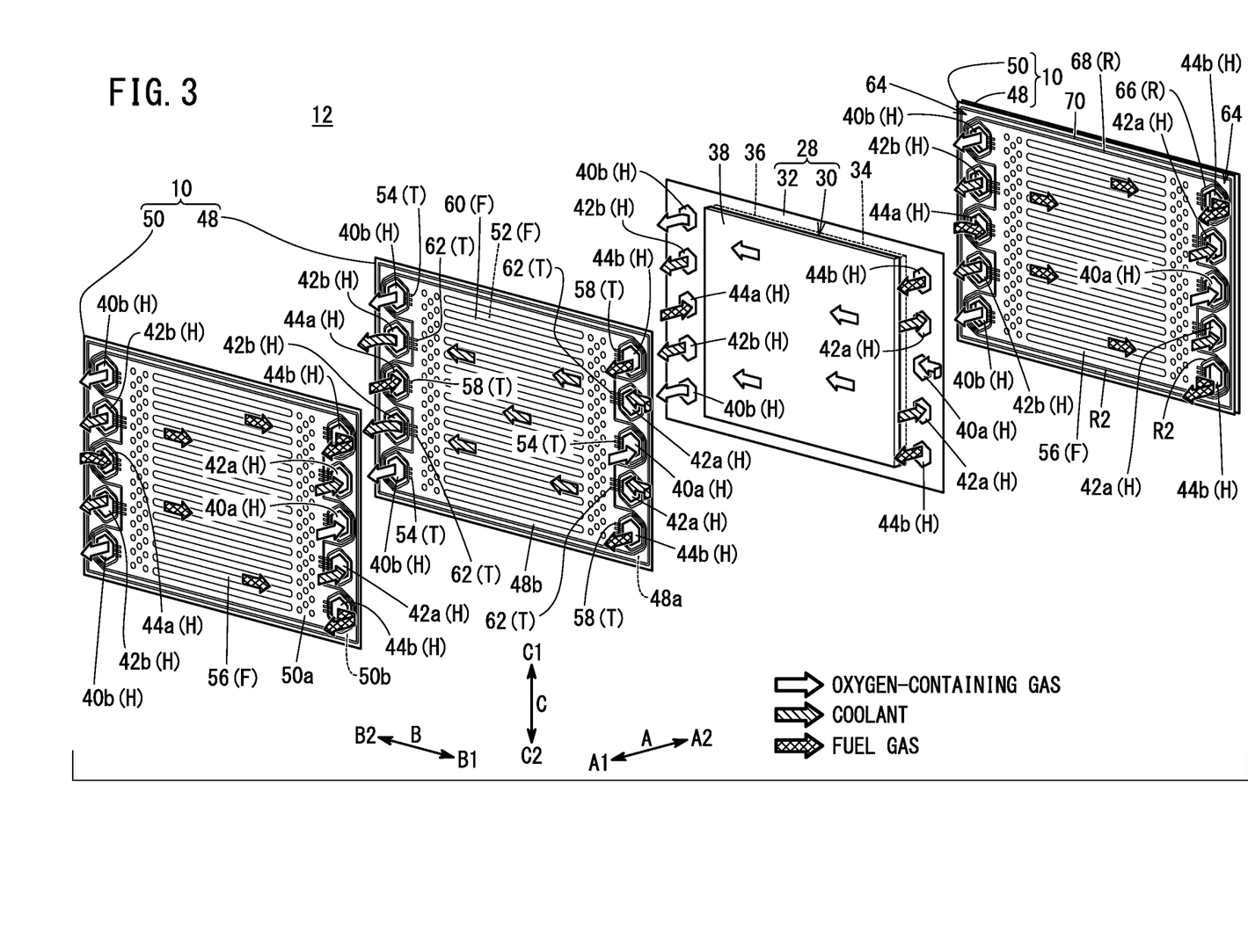
FIG. 3 is an exploded perspective view of a power generation cell.

As shown in FIGS. 1 to 3, a fuel cell separator 10 according to the present embodiment constitutes a part of a power generation cell 12 (unit fuel cell). As shown in FIGS. 1 and 2, the power generation cells 12 are provided in a fuel cell stack 16 in the form of a cell stack body 14 in which the plurality of power generation cells 12 are stacked in a horizontal direction (direction indicated by an arrow A) or a gravity direction (direction indicated by an arrow C). For example, the fuel cell stack 16 can be suitably applied to, a fuel cell vehicle such as a fuel cell electric vehicle (not shown), but is not particularly limited thereto. The fuel cell stack 16 may be used in stationary applications or the like.

As shown in FIGS. 1 and 2, at one end portion of the cell stack body 14 in the stacking direction (end portion in the direction indicated by an arrow A1), a terminal plate 18a (FIG. 2) is disposed. An insulator 20a is disposed outside the terminal plate 18a, and an end plate 22a is disposed outside the insulator 20a. At the other end portion of the cell stack body 14 in the stacking direction (end portion in the direction indicated by an arrow A2), a terminal plate 18b (FIG. 2) is disposed. An insulator 20b is disposed outside the terminal plate 18b, and an end plate 22b is disposed outside the insulator 20b.

Each of the terminal plates 18a, 18b is made of electrically conductive material. An example of material of each of the terminal plates 18a, 18b is a metal such as copper, aluminum, or stainless steel. As shown in FIG. 1, terminal units 24 are provided at the centers or at substantially the centers of the terminal plates 18a, 18b.

Each of the insulators 20a, 20b is made of insulating material such as polycarbonate (PC) or phenol resin. Each of the insulators 20a, 20b may be formed of a plurality of (for example, two) insulators overlapped in the stacking direction. In the present embodiment, as shown in FIG. 2, a recess is formed on a surface of the insulator 20a facing the cell stack 14. The recess is recessed in a direction away from the cell stack 14. The terminal plate 18a is disposed in the recess. In the present embodiment, as shown in FIG. 2, a recess is formed on a surface of the insulator 20b facing the cell stack 14. The recess is recessed in a direction away from the cell stack 14. The terminal plate 18b is disposed in the recess.

As shown in FIG. 1, each of the end plates 22a, 22b is formed in a rectangular shape having short sides along the direction indicated by the arrow C and long sides along the direction indicated by an arrow B. Note that each of the end plates 22a, 22b may be formed in a rectangular shape having short sides along the direction indicated by the arrow B and long sides along the direction indicated by the arrow C. A coupling bar 26 extending in the stacking direction (direction indicated by the arrow A) is disposed between each side of the end plate 22a and each side of the end plate 22b. One end of each coupling bar 26 is fixed to the inner surface of the end plate 22a via a bolt. The other end of each coupling bar 26 is fixed to the inner surface of the end plate 22b via a bolt.

As a result, a predetermined compression load (hereinafter also simply referred to as the "compression load") is applied in the stacking direction to the plurality of power generation cells 12 sandwiched between the end plate 22a and the end plate 22b. The fuel cell stack 16 may be provided with a casing (not shown) including the end plate 22a and the end plate 22b. The cell stack body 14 may be placed in the casing.

As shown in FIGS. 2 and 3, in the present embodiment, each power generation cell 12 includes a resin frame equipped MEA 28 and a pair of separators 10. The pair of separators 10 sandwich the resin frame equipped MEA 28. The resin frame equipped MEA 28 includes a membrane electrode assembly (MEA) 30 and a resin frame member 32. As shown in FIG. 2, the membrane electrode assembly 30 includes an electrolyte membrane 34, an anode 36, and a cathode 38. The anode 36 is provided on one surface of the electrolyte membrane 34 (surface oriented in the direction indicated by the arrow A2). The cathode 38 is provided on the other surface of the electrolyte membrane 34 (surface oriented in the direction indicated by the arrow A1).

For example, the electrolyte membrane 34 is a solid polymer electrolyte membrane (cation ion exchange membrane) such as a thin membrane of perfluorosulfonic acid containing water. The electrolyte membrane 34 is interposed between the anode 36 and the cathode 38. A fluorine based electrolyte may be used as the electrolyte membrane 34. Alternatively, an HC (hydrocarbon) based electrolyte may be used as the electrolyte membrane 34.

The cathode 38 includes a cathode catalyst layer 38a and a cathode gas diffusion layer 38b. The cathode catalyst layer 38a is joined to a surface of the electrolyte membrane 34 oriented in the direction indicated by the arrow A1. The cathode gas diffusion layer 38b is stacked on the cathode catalyst layer 38a. The anode 36 includes an anode catalyst layer 36a and an anode gas diffusion layer 36b. The anode catalyst layer 36a is joined to a surface of the electrolyte membrane 34 oriented in the direction indicated by the arrow A2. The anode gas diffusion layer 36b is stacked on the anode catalyst layer 36a. In the present embodiment, the surface size (outer size) of the anode gas diffusion layer 36b is larger than the surface size (outer size) of the electrolyte membrane 34, but the present invention is not limited particularly in this respect. In the present embodiment, the surface size (outer size) of the cathode gas diffusion layer 38b is larger than the surface size (outer size) of the electrolyte membrane 34, but the present invention is not limited particularly in this respect.

For example, the cathode catalyst layer 38a is formed by porous carbon particles deposited uniformly on the surface of the cathode gas diffusion layer 38b together with an ion conductive polymer binder and platinum alloy supported on the surfaces of the porous carbon particles. The anode catalyst layer 36a is formed by porous carbon particles deposited uniformly on the surface of the anode gas diffusion layer 36b together with an ion conductive polymer binder and platinum alloy supported on the surfaces of the porous carbon particles.

Each of the cathode gas diffusion layer 38b and the anode gas diffusion layer 36b comprises an electrically conductive porous sheet such as carbon paper or carbon cloth. An electrically conductive porous layer (not shown) may be provided at least at one of a position between the cathode catalyst layer 38a and the cathode gas diffusion layer 38b, or a position between the anode catalyst layer 36a and the anode gas diffusion layer 36b.

The resin frame member 32 has a frame shape. For example, an inner marginal portion of the resin frame member 32 is joined to an outer peripheral edge portion of the membrane electrode assembly 30. By providing the resin frame member 32 on the outer periphery of the membrane electrode assembly 30 in this manner, it is possible to reduce the area of the relatively expensive electrolyte membrane 34 required for configuring one power generation cell 12.

The joint structure between the resin frame member 32 and the membrane electrode assembly 30 is not particularly limited. For example, in this joint structure, the inner peripheral edge portion of the resin frame member 32 may be sandwiched between the outer peripheral edge portion of the cathode gas diffusion layer 38b and the outer peripheral edge portion of the anode gas diffusion layer 36b. In this case, the inner peripheral end surface of the resin frame member 32 may be positioned close to the outer peripheral end surface of the electrolyte membrane 34. The inner peripheral end surface of the resin frame member 32 may be in contact with the outer peripheral end surface of the electrolyte membrane 34. The inner peripheral end surface of the resin frame member 32 may overlap the outer peripheral end surface of the electrolyte membrane 34.

The joint structure described above can be modified as follows. An outer marginal portion of the electrolyte membrane 34 is made to protrude outward from the cathode gas diffusion layer 38b. The outer marginal portion of the electrolyte membrane 34 is made to protrude outward from the anode gas diffusion layer 36b. The resin frame member 32 is configured by providing frame shaped films on both sides of the outer marginal portion of the electrolyte membrane 34. That is, the resin frame member 32 may be configured by joining a plurality of stacked frame shaped films with an adhesive or the like. In a case where the electrolyte membrane 34 protrudes outward, the power generation cell 12 need not necessarily include the resin frame member 32.

As shown in FIG. 1, in one marginal portion in the long side direction (the marginal portion in the direction indicated by the arrow B1) of each of the power generation cell 12, the end plate 22a, and the insulators 20a, 20b, one oxygen-containing gas supply passage 40a, two coolant supply passages 42a, and two fuel gas discharge passages 44b are provided. In the other marginal portion in the long side direction (the marginal portion in the direction indicated by the arrow B2) of each of the power generation cell 12, the end plate 22a, and the insulators 20a, 20b, one fuel gas supply passage 44a, two coolant discharge passages 42b, and two oxygen-containing gas discharge passages 40b are provided.

A fuel gas (such as the hydrogen-containing gas) is discharged from the fuel gas discharge passages 44b. An oxygen-containing gas is supplied to the oxygen-containing gas supply passage 40a. A coolant (for example, at least any one of pure water, ethylene glycol, oil, or the like) is supplied to the coolant supply passages 42a. The fuel gas is supplied to the fuel gas supply passage 44a. The coolant is discharged from the coolant discharge passages 42b. The oxygen-containing gas is discharged from the oxygen-containing gas discharge passages 40b.

The oxygen-containing gas supply passage 40a, the coolant supply passages 42a, the fuel gas discharge passages 44b, the fuel gas supply passage 44a, the coolant discharge passages 42b, the oxygen-containing gas discharge passages 40b are also collectively referred to as the "fluid passages H". The fluid passages H penetrate through the fuel cell stack 16 in the stacking direction except for the terminal plates 18a, 18b (FIG. 2) and the end plate 22b.

The fuel gas supply passage 44a and the fuel gas discharge passages 44b are also collectively referred to as "fuel gas passages 44a, 44b". The oxygen-containing gas supply passage 40a and the oxygen-containing gas discharge passages 40b are also collectively referred to as "oxygen-containing gas passages 40a, 40b". The coolant supply passages 42a and the coolant discharge passages 42b are also collectively referred to as "coolant passages 42a, 42b".

These fluid passages H are arranged in the vertical direction (in the direction indicated by the arrows C1, C2). Specifically, as shown in FIG. 3, the two fuel gas discharge passages 44b are arranged vertically at a distance from each other at one end of the power generation cell 12 in the long side direction (a marginal portion in the direction indicated by the arrow B1). The two coolant supply passages 42a are arranged vertically at a distance, between the two fuel gas discharge passages 44b. The oxygen-containing gas supply passage 40a is disposed between the two coolant supply passages 42a.

The two oxygen-containing gas discharge passages 40b are arranged vertically at a distance from each other at the other end of the power generation cell 12 in the long side direction (a marginal portion in the direction indicated by the arrow B2). The two coolant discharge passages 42b are arranged vertically at a distance, between the two oxygen-containing gas discharge passages 40b. The fuel gas supply passage 44a is disposed between the two coolant discharge passages 42b.

Note that the fluid passages H are not limited to the above-described layout and number. The layout and the number of the fluid passages H can be chosen depending on the required specification. For example, only one fuel gas discharge passage 44b may be provided. Only one oxygen-containing gas discharge passage 40b may be provided. Only one coolant supply passage 42a may be provided. Only one coolant discharge passage 42b may be provided.

Figure 4:
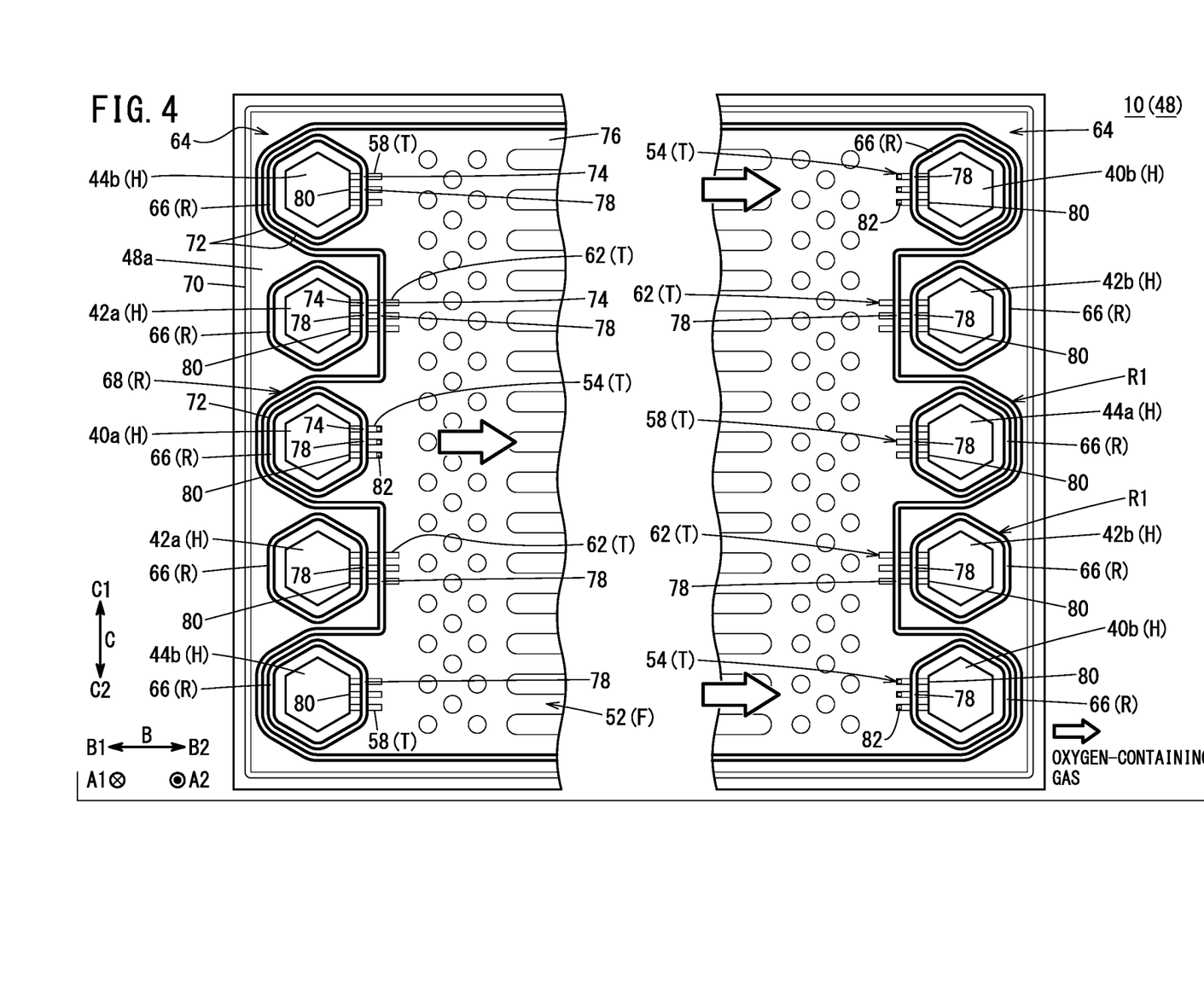
FIG. 4 is a schematic front view of an MEA side surface of a first bipolar plate.
Figure 5:
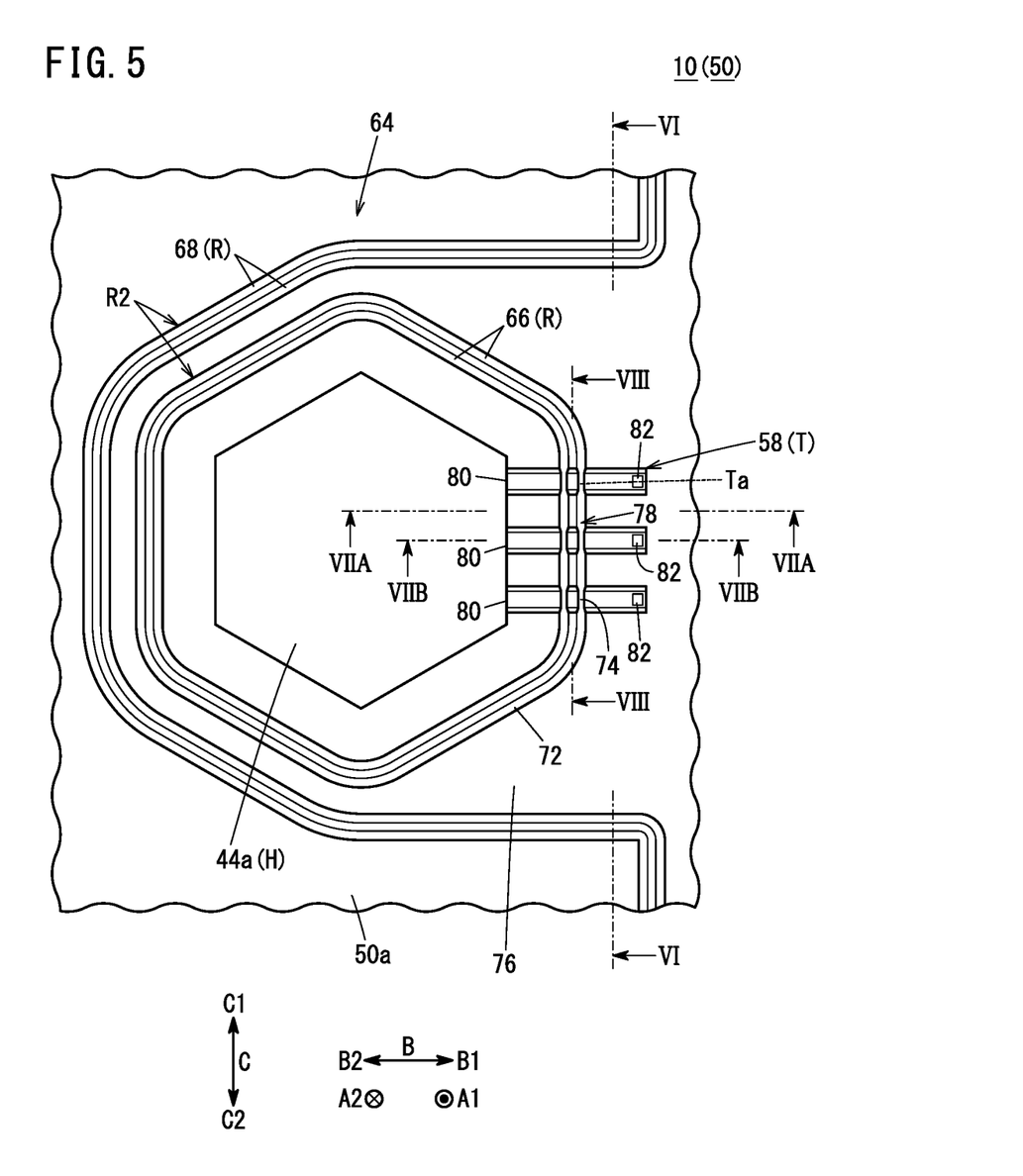
FIG. 5 is an enlarged view of the vicinity of a fuel gas supply passage on the MEA side surface of a second bipolar plate.

Further, in the present embodiment, for example, as shown in FIGS. 4 and 5, the shape of each fluid passage H as viewed in the stacking direction (the direction indicated by the arrow A) is a hexagonal shape, but is not particularly limited thereto. For example, the shape of each fluid passage H as viewed in the stacking direction may be a polygonal shape other than a hexagonal shape, or may be a polygonal shape with rounded corners other than a hexagonal shape. The shape of each fluid passage H as viewed in the stacking direction may be circular. In this case, in each of the fluid passages H, a side adjacent to the outer edge of the separator 10 as viewed in the stacking direction has preferably a straight side along the outer edge of the separator 10. For example, compared to a case where the side of each fluid passage H is bent or curved with respect to the outer edge of the separator 10, the entire side of each fluid passage H can be disposed close to the outer edge of the separator 10. As a result, it is possible to avoid formation of an unnecessary portion between each fluid passage H and the outer edge of the separator 10. Furthermore, it is possible to reduce the size of the separator 10 while maintaining the area of each fluid passage H.

As shown in FIG. 3, the separator 10 is formed of a first bipolar plate 48 and a second bipolar plate 50 that are stacked. The outer periphery of the first bipolar plate 48 and the outer periphery of the second bipolar plate 50 may be integrally joined by welding, brazing, swaging, crimping, or the like. For example, each of the first bipolar plate 48 and the second bipolar plate 50 is made of a metal material such as a steel plate, a stainless steel plate, an aluminum plate, or a plated steel plate, or a thin plate having an anti-corrosive surface by surface treatment on the metal material. Each of the first bipolar plate 48 and the second bipolar plate 50 is formed by press forming of the thin plate to have a corrugated shape in cross section. The separator 10 is not limited to a structure in which the first bipolar plate 48 and the second bipolar plate 50 are joined together. The separator 10 may be formed of one metal plate (bipolar plate).

The first bipolar plate 48 has an MEA side surface 48a facing the resin frame equipped MEA 28 and a coolant side surface 48b on the back of the MEA side surface 48a. The second bipolar plate 50 has an MEA side surface 50a facing the resin frame equipped MEA 28 and a coolant side surface 50b on the back of the MEA side surface 50a.

As shown in FIG. 4, the MEA side surface 48a of the first bipolar plate 48 is provided with a plurality of ridges extending straight in the direction indicated by the arrow B. An oxygen-containing gas flow field 52 is formed in the grooves between the ridges. It should be noted that the ridges may extend in a wavy pattern. The oxygen-containing gas flow field 52 is connected to (in fluid communication with) the one oxygen-containing gas supply passage 40a via oxygen-containing gas tunnel portions 54 described later. The oxygen-containing gas flow field 52 is connected to (in fluid communication with) the two oxygen-containing gas discharge passages 40b via oxygen-containing gas tunnel portions 54 described later. Thus, the oxygen-containing gas flow field 52 allows the oxygen-containing gas to flow in the separator surface directions (indicated by the arrows B and C).

As shown in FIG. 3, the MEA side surface 50a of the second bipolar plate 50 is provided with a plurality of ridges extending straight in the direction indicated by the arrow B. An fuel gas flow field 56 is formed in the grooves between the ridges. It should be noted that the ridges may extend in a wavy pattern. The fuel gas flow field 56 is connected to (in fluid communication with) the one fuel gas supply passage 44a via fuel gas tunnel portions 58 described later. The fuel gas flow field 56 is connected to (in fluid communication with) the two fuel gas discharge passages 44b via fuel gas tunnel portions 58 described later. Thus, the fuel gas flow field 56 allows the fuel gas to flow in the separator surface directions.

In the separator 10, the coolant side surface 48b of the first bipolar plate 48 and the coolant side surface 50b of the second bipolar plate 50 face each other. A coolant flow field 60 is formed between the coolant side surface 48b and the coolant side surface 50b. When the first bipolar plate 48 and the second bipolar plate 50 are stacked together, the coolant flow field 60 is formed between the back surface of the MEA side surface 48a of the first bipolar plate 48 and the back surface of the MEA side surface 50a of the second bipolar plate 50. The coolant flow field 60 is connected to (in fluid communication with) the two coolant supply passages 42a via coolant tunnel portions 62 described later. The coolant flow field 60 is connected to (in fluid communication with) the two coolant discharge passages 42b via coolant tunnel portions 62 described later. Thus, the coolant flow field 60 allows the coolant to flow in the separator surface directions.

Hereinafter, the oxygen-containing gas flow field 52, the fuel gas flow field 56, and the coolant flow field 60 are also collectively referred to as fluid flow fields F. The oxygen-containing gas tunnel portions 54, the fuel gas tunnel portions 58, and the coolant tunnel portions 62 are also collectively referred to as tunnel portions T.

As shown in FIG. 4, an outer area 64 is provided outside the oxygen-containing gas flow field 52 and the coolant flow field 60 of the first bipolar plate 48 in the separator plane directions. As shown in FIG. 3, an outer area 64 is provided outside the fuel gas flow field 56 and the coolant flow field 60 of the second bipolar plate 50 in the separator plane directions. These outer areas 64 face portions of the resin frame equipped MEA 28 outside the anode 36 and the cathode 38 when viewed in the stacking direction.

The fluid passage H is provided in the outer area 64. In each separator 10, the periphery of the fluid passage H of the first bipolar plate 48 (excluding the tunnel portions T) and the periphery of the fluid passage H of the second bipolar plate 50 (excluding the tunnel portions T) face each other in the stacking direction. The periphery of the fluid passage H of the first bipolar plate 48 (excluding the tunnel portions T) and the periphery of the fluid passage H of the second bipolar plate 50 (excluding the tunnel portions T) may be joined by welding, brazing, or the like.

As shown in FIGS. 2 and 3, the first bipolar plate 48 is provided with passage rubber seal members 66 (FIG. 3), a reactant gas rubber seal member 68, and an outer peripheral seal 70 (FIG. 3). The passage rubber seal members 66, the reactant gas rubber seal member 68, and the outer peripheral seal 70 of the first bipolar plate 48 protrude from the MEA side surface 48*a* toward the resin frame equipped MEA 28 in the stacking direction. The second bipolar plate 50 is provided with passage rubber seal members 66 (FIG. 3), a reactant gas rubber seal member 68, and an outer peripheral seal 70 (FIG. 3). The passage rubber seal members 66, the reactant gas rubber seal member 68, and the outer peripheral seal 70 of the second bipolar plate 50 protrude from the MEA side surface 50*a* toward the resin frame equipped MEA 28 in the stacking direction. The passage rubber seal members 66 and the reactant gas rubber seal member 68 are also collectively referred to as rubber seal members R.

The rubber seal members R provided on the first bipolar plate 48 are also referred to as first rubber seal members R1. The rubber seal members R provided on the second bipolar plate 50 are also referred to as second rubber seal members R2. For example, in the case where the first rubber seal member R1 and the second rubber seal member R2 are not distinguished from each other, they are also collectively referred to as rubber seal members R. In the present embodiment, the first rubber seal member R1 and the second rubber seal member R2 are determined to have the same or substantially the same shape and size. That is, in the present embodiment, the width of the first rubber seal member R1 defined perpendicularly to the extending direction and the width of the second rubber seal member R2 defined perpendicularly to the extending direction are determined to be the same or substantially the same.

As shown in FIG. 2, the first rubber seal members R1 and the outer peripheral seal 70 (FIG. 3) provided on the first bipolar plate 48 protrude in a direction opposite to the second bipolar plate 50 that constitutes the separator 10 together with the first bipolar plate 48. The second rubber seal members R2 and the outer peripheral seal 70 (FIG. 3) provided on the second bipolar plate 50 protrude in a direction opposite to the first bipolar plate 48 that constitutes the separator 10 together with the second bipolar plate 50.

In the separator 10, the positions of the first rubber seal members R1 as viewed in the stacking direction and the positions of the second rubber seal members R2 as viewed in the stacking direction are determined to overlap with each other. The position of the outer peripheral seal 70 of the first bipolar plate 48 as viewed in the stacking direction and the position of the outer peripheral seal 70 of the second bipolar plate 50 as viewed in the stacking direction are determined to overlap with each other.

For this reason, in the present embodiment, the distal ends of the first rubber seal members R1 on the first bipolar plate 48 in the protruding direction and the distal ends of the second rubber seal members R2 on the second bipolar plate 50 of another adjacent separator 10 face each other while the resin frame member 32 is interposed therebetween. The distal end of the outer peripheral seal 70 (FIG. 3) on the first bipolar plate 48 in the protruding direction and the distal end of the outer peripheral seal 70 on the second bipolar plate 50 of another adjacent separator 10 face each other while the resin frame member 32 is interposed therebetween.

As shown in FIGS. 3 and 4, the rubber seal members R provide seals between the fluid flow fields F and the fluid passages H. The rubber seal member R is formed of material having rubber elasticity. Examples of the material having rubber elasticity include various resin-based elastomers (for example, silicone rubber and fluororubber) and vulcanized rubber. The passage rubber seal members 66 individually surround the fluid passages H. The reactant gas rubber seal member 68 integrally surrounds the fluid flow field F, the oxygen-containing gas passages 40*a*, 40*b*, and the fuel gas passages 44*a*, 44*b*.

As shown in FIGS. 2, 5 to 7A and 7B, in the present embodiment, one pair (double lip) of two passage rubber seal members 66 are arranged in parallel in the separator surface direction. One pair (double lip) of two reactant gas rubber seal members 68 are arranged in parallel in the separator surface direction. In FIGS. 3 and 4, for convenience of illustration, the pair of the rubber seal members R is shown as a single line.

Figure 7A:
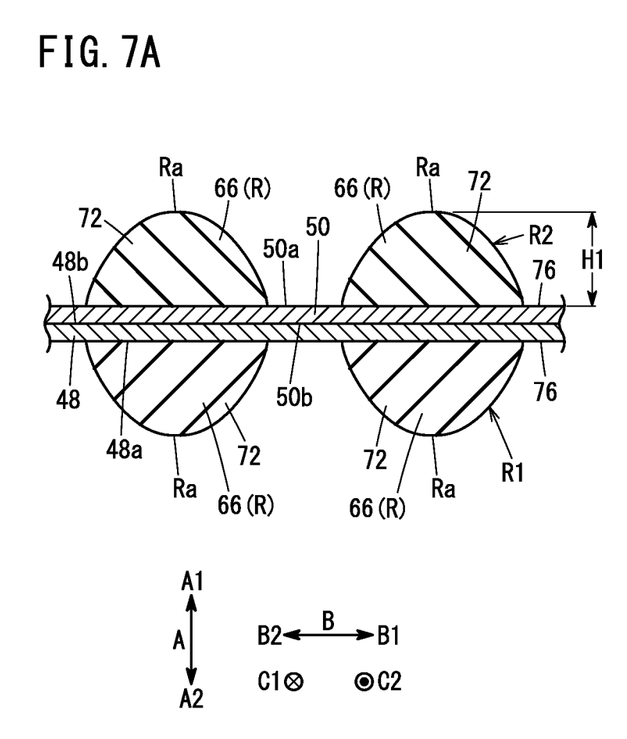
FIG. 7A is a partial cross-sectional view taken along line VIIA-VIIA of FIG. 5.
Figure 7B:
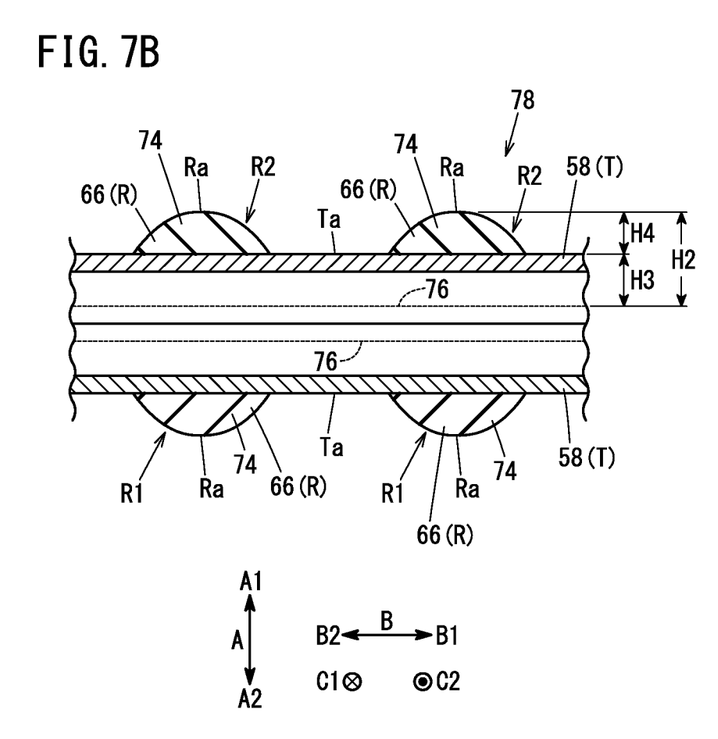
FIG. 7B is a partial cross-sectional view taken along line VIIB-VIIB of FIG. 5.

In the present embodiment, the two rubber seal members R, which are arranged in parallel in the separator surface direction as one pair, have the same shape. As shown in FIGS. 7A and 7B, in a state before the fuel cell stack 16 is assembled (a state in which a compression load is not applied), an end surface Ra of each rubber seal member R in a protruding direction has an arc shape protruding in a direction from a proximal end toward a distal end thereof. In addition, the width of the rubber seal member R defined perpendicularly to the extending direction decreases from the proximal end toward the distal end in the protruding direction. It should be noted that each of the rubber seal members R shown in the drawings except for FIGS. 7A and 7B is in a state of being elastically deformed by receiving a compression load.

The shape of the rubber seal member R is not limited to the shapes described above. For example, the distal end surface Ra of each rubber seal member R in the protruding direction may be flat in a state where no compression load is applied. Further, the two rubber seal members R, which are arranged in parallel in the separator surface direction as one pair, may have different shapes from each other.

As shown in FIGS. 4 to 7A and 7B, the passage rubber seal member 66 has a first portion 72 and a second portion 74. The reactant gas rubber seal member 68 has a first portion 72 and a second portion 74. Details of the first portion 72 and the second portion 74 will be described later.

As shown in FIG. 3, the outer peripheral seal 70 surrounds the outer marginal portion of the separator 10. Further, the outer peripheral seal 70 may be formed of material having the same rubber elasticity as the rubber seal members R. The outer peripheral seal 70 may be a bead seal formed by press forming or the like. In the case where the outer peripheral seal 70 is formed of material having rubber elasticity, one pair of the two outer peripheral seals 70 may be arranged in parallel in the separator surface direction in the same manner as the rubber seal member R, or one set of three or more outer peripheral seals 70 may be provided, or only one outer peripheral seal 70 may be provided. Further, the outer peripheral seal 70 need not necessarily be provided.

As shown in FIGS. 4 to 7A and 7B, a flat portion 76 is provided in the outer area 64 of the separator 10. The tunnel portions T are provided in the flat portion 76. The tunnel portions T extend so as to intersect the rubber seal members R at intersections 78. Specifically, the tunnel portions T are provided in the flat portion 76 of the first bipolar plate 48 in FIG. 4. Further, the tunnel portions T are provided in the flat portion 76 of the second bipolar plate 50 in FIG. 5.

Figure 6:
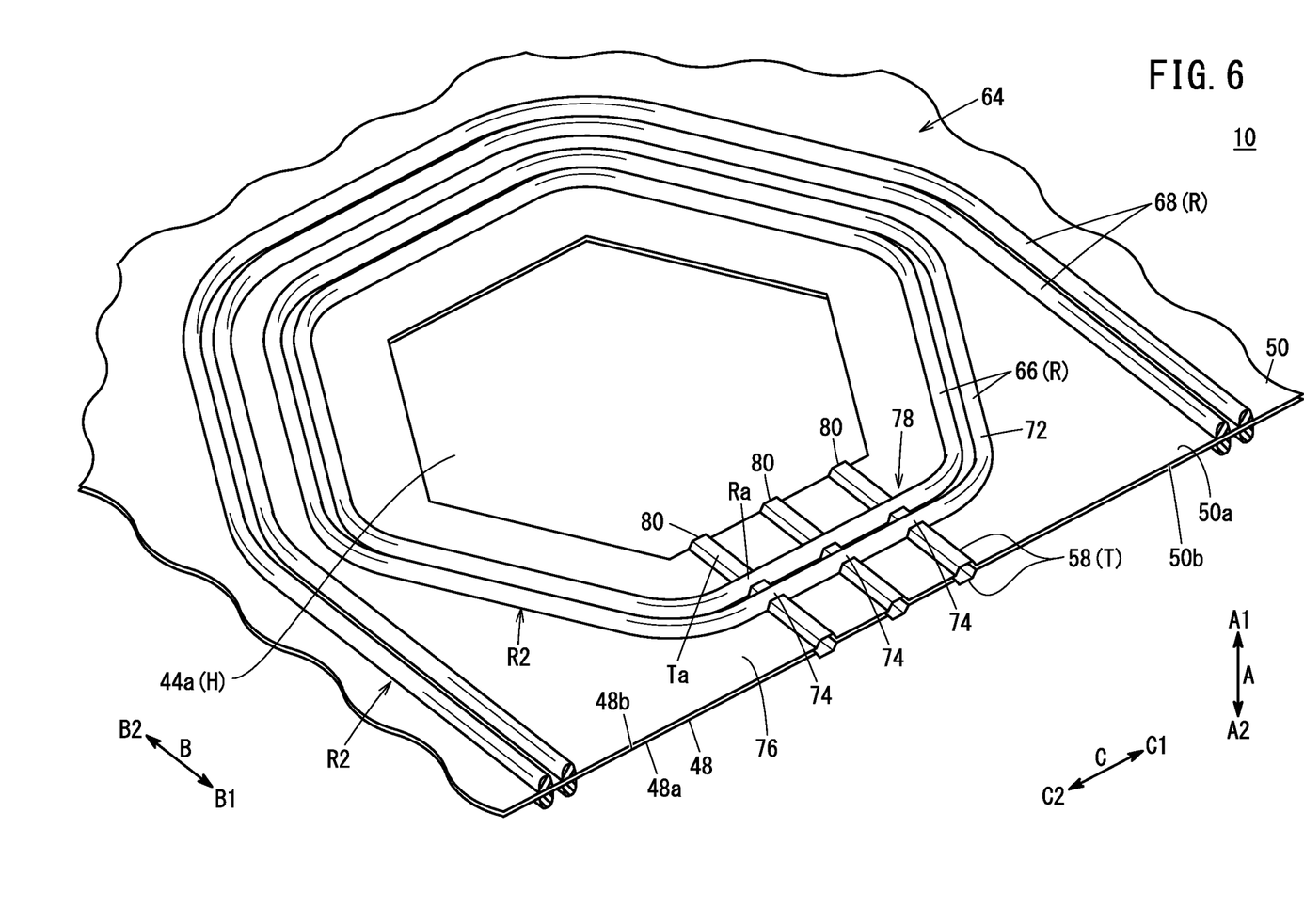
FIG. 6 is a perspective view illustrating a separator including a cross section taken along line VI-VI of FIG. 5.
Figure 8:
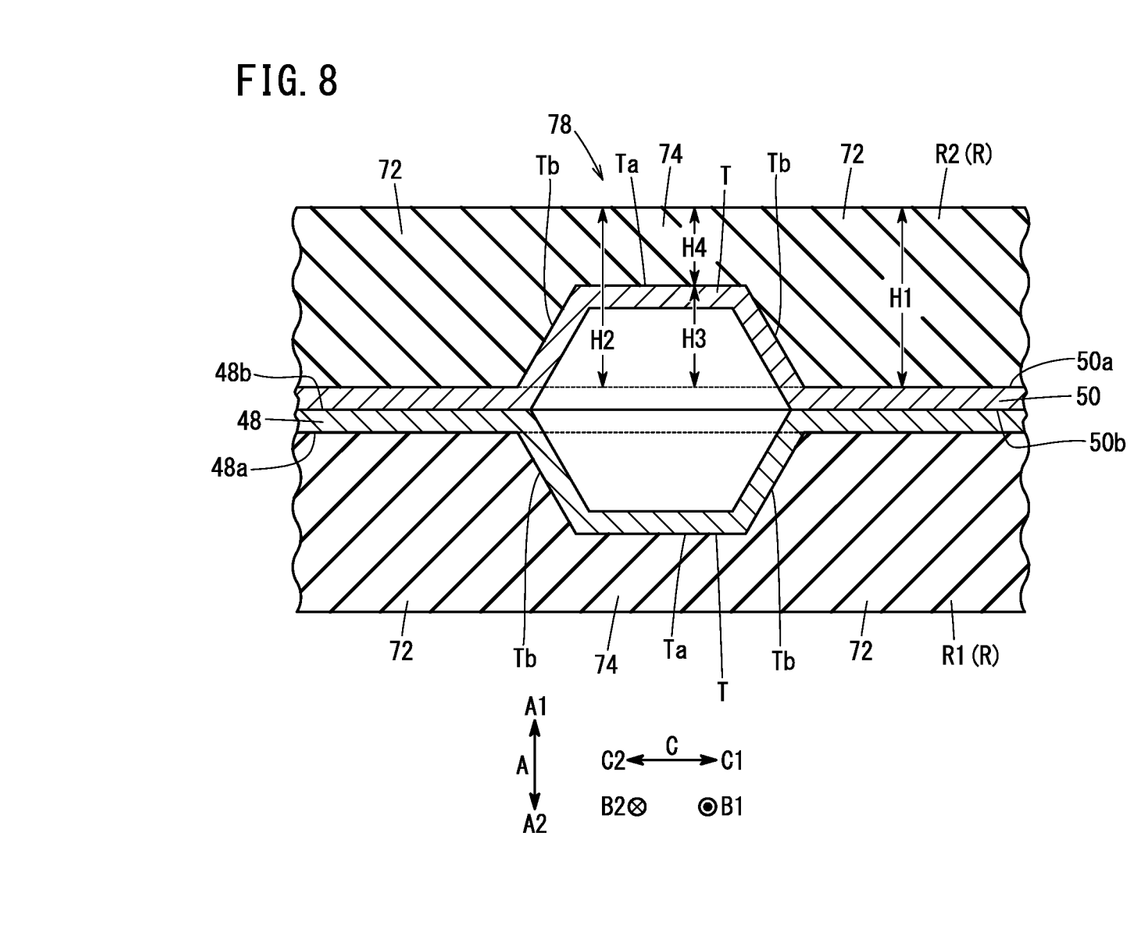
FIG. 8 is a partial cross-sectional view taken along line VIII-VIII of FIG. 5.

The tunnel portions T provided in the flat portion 76 of the first bipolar plate 48 are formed, for example, by press forming so as to expand from the first bipolar plate 48 integrally therewith. The tunnel portions T provided in the flat portion 76 of the second bipolar plate 50 are formed, for example, by press forming so as to expand from the second bipolar plate 50 integrally therewith. That is, the rubber seal member R, made of material having rubber elasticity, and the tunnel portion T formed of a part of the separator 10 are made of different members from each other. As shown in FIGS. 6, 7B, and 8, the tunnel portions T each have a hollow shape, protruding from the MEA side surfaces 48a, 50a of the flat portion 76 in the same direction as the protruding direction of each rubber seal member R therefrom.

In the separator 10, each position in the stacking direction of the tunnel portions T provided in the first bipolar plate 48 overlaps each position in the stacking direction of the tunnel portions T provided in the second bipolar plate 50. That is, the hollow portion inside each tunnel portion T provided in the first bipolar plate 48 and the hollow portion inside each tunnel portion T provided in the second bipolar plate 50 communicate with each other.

As shown in FIG. 4, the oxygen-containing gas tunnel portions 54 extend between the oxygen-containing gas passage 40a and the fluid flow field F when viewed in the separator thickness direction (stacking direction or the direction indicated by the arrow A). The oxygen-containing gas tunnel portions 54 intersect the passage rubber seal members 66 surrounding the oxygen-containing gas passage 40a at intersections 78. The oxygen-containing gas tunnel portions 54 extend between the oxygen-containing gas passage 40b and the fluid flow field F when viewed in the separator thickness direction (the stacking direction or the direction indicated by the arrow A). The oxygen-containing gas tunnel portions 54 intersect the passage rubber seal members 66 surrounding the oxygen-containing gas passage 40b at intersections 78. A passage side opening 80 is provided at an end of each of the oxygen-containing gas tunnel portions 54 near the oxygen-containing gas passage 40a in the extending direction of the oxygen-containing gas tunnel portions 54 and opens toward the oxygen-containing gas passage 40a. A passage side opening 80 is provided at an end of each of the oxygen-containing gas tunnel portions 54 near the oxygen-containing gas passage 40b in the extending direction of the oxygen-containing gas tunnel portions 54 and opens toward the oxygen-containing gas passage 40b.

On the other hand, a flow field side opening 82 is provided at an end of each of the oxygen-containing gas tunnel portions 54 near the oxygen-containing gas flow field 52 in the extending direction of the oxygen-containing gas tunnel portions 54 formed in the first bipolar plate 48 and opens toward the oxygen-containing gas flow field 52. In the extending direction of the oxygen-containing gas tunnel portions 54 provided in the second bipolar plate 50, ends of the oxygen-containing gas tunnel portions 54 near the fuel gas flow field 56 are closed. The flat portion 76 of the coolant side surface 48b around the oxygen-containing gas tunnel portions 54 and the flat portion 76 of the coolant side surface 50b around the oxygen-containing gas tunnel portions 54 may be joined by welding. The flat portion 76 of the coolant side surface 48b around the oxygen-containing gas tunnel portions 54 and the flat portion 76 of the coolant side surface 50b around the oxygen-containing gas tunnel portions 54 may be joined by brazing.

Thus, a connection channel for connecting the oxygen-containing gas passage 40a and the oxygen-containing gas flow field 52 is formed inside each of the oxygen-containing gas tunnel portions 54. A connection channel for connecting the oxygen-containing gas passage 40b and the oxygen-containing gas flow field 52 is formed inside each of the oxygen-containing gas tunnel portions 54. The connection channel does not connect the oxygen-containing gas passage 40a to the fluid flow field F (the fuel gas flow field 56 and the coolant flow field 60) other than the oxygen-containing gas flow field 52. The connection channel does not connect the oxygen-containing gas passages 40b to the fluid flow field F (the fuel gas flow field 56 and the coolant flow field 60) other than the oxygen-containing gas flow field 52.

In the present embodiment, three oxygen-containing gas tunnel portions 54 are disposed for one oxygen-containing gas passage 40a. The three oxygen-containing gas tunnel portions 54 are disposed for one oxygen-containing gas passage 40b. However, the number of the oxygen-containing gas tunnel portions 54 disposed for one oxygen-containing gas passage 40a is not particularly limited. A single oxygen-containing gas tunnel portion 54 may be disposed for one oxygen-containing gas passage 40a. The number of the plurality of oxygen-containing gas tunnel portions 54 disposed for one oxygen-containing gas passage 40a may be other than three. The number of the oxygen-containing gas tunnel portions 54 disposed for one oxygen-containing gas passage 40b is not particularly limited. A single oxygen-containing gas tunnel portion 54 may be disposed for one oxygen-containing gas passage 40b. The number of the plurality of oxygen-containing gas tunnel portions 54 disposed for one oxygen-containing gas passage 40b may be other than three.

As shown in FIGS. 3 and 5, the fuel gas tunnel portions 58 extend between the fuel gas passage 44a and the fluid flow field F as viewed in the separator thickness direction. The fuel gas tunnel portions 58 intersect the passage rubber seal members 66 surrounding the fuel gas passage 44a at intersections 78 (FIG. 5). The fuel gas tunnel portions 58 extend between the fuel gas passage 44b and the fluid flow field F as viewed in the separator thickness direction. The fuel gas tunnel portions 58 intersect the passage rubber seal members 66 surrounding the fuel gas passage 44b at intersections 78 (FIG. 5). A passage side opening 80 (FIG. 5) is provided at an end of each of the fuel gas tunnel portions 58 near the fuel gas passage 44a in the extending direction of the fuel gas tunnel portions 58 and opens toward the fuel gas passage 44a. A passage side opening 80 (FIG. 5) is provided at an end of each of the fuel gas tunnel portions 58 near the fuel gas passage 44b in the extending direction of the fuel gas tunnel portions 58 and opens toward the fuel gas passage 44b.

On the other hand, a flow field side opening 82 (FIG. 5) is provided at an end of each of the fuel gas tunnel portions 58 near the fuel gas flow field 56 in the extending direction of the fuel gas tunnel portions 58 formed in the second bipolar plate 50 and opens toward the fuel gas flow field 56. In the extending direction of the fuel gas tunnel portions 58 provided in the first bipolar plate 48, ends of the fuel gas tunnel portions 58 near the oxygen-containing gas flow field 52 are closed. The flat portion 76 of the coolant side surface 48b around the fuel gas tunnel portions 58 and the flat portion 76 of the coolant side surface 50b around the fuel gas tunnel portions 58 may be joined by welding, brazing, or the like.

Thus, a connection channel for connecting the fuel gas passage 44a and the fuel gas flow field 56 is formed inside each of the fuel gas tunnel portions 58. A connection channel for connecting the fuel gas passage 44b and the fuel gas flow field 56 is formed inside each of the fuel gas tunnel portions 58. The connection channel does not connect the fuel gas passage 44a to the fluid flow fields F other than the fuel gas flow field 56 (the oxygen-containing gas flow field 52 and the coolant flow field 60). The connection channel does not connect the fuel gas passages 44b to the fluid flow fields F other than the fuel gas flow field 56 (the oxygen-containing gas flow field 52 and the coolant flow field 60).

In the present embodiment, three fuel gas tunnel portions 58 are disposed for one fuel gas passage 44a. Three fuel gas tunnel portions 58 are disposed for one fuel gas passage 44b. However, the number of the fuel gas tunnel portions 58 disposed for one fuel gas passage 44a is not particularly limited. A single fuel gas tunnel portion 58 may be disposed for one fuel gas passage 44a. The number of the plurality of fuel gas tunnel portions 58 disposed for one fuel gas passage 44a may be other than three. The number of the fuel gas tunnel portions 58 disposed for one fuel gas passage 44b is not particularly limited. A single fuel gas tunnel portion 58 may be disposed for one fuel gas passage 44b. The number of the plurality of fuel gas tunnel portions 58 disposed for one fuel gas passage 44b may be other than three.

As shown in FIG. 3, the coolant tunnel portions 62 extend between the coolant passages 42a and the fluid flow field F as viewed in the separator thickness direction. The coolant tunnel portions 62 intersect the passage rubber seal members 66 surrounding the coolant passages 42a at intersections 78. The coolant tunnel portions 62 extend between the coolant passages 42b and the fluid flow field F as viewed in the separator thickness direction. The coolant tunnel portions 62 intersect the passage rubber seal members 66 surrounding the coolant passages 42b at intersections 78. The coolant tunnel portions 62 intersect the reactant gas rubber seal member 68 at intersections 78. A passage side opening 80 (FIG. 4) is provided at an end of each of the coolant tunnel portions 62 near the coolant passage 42a in the extending direction of the coolant tunnel portions 62 and opens toward the coolant passage 42a. A passage side opening 80 (FIG. 4) is provided at an end of each of the coolant tunnel portions 62 near the coolant passage 42b in the extending direction of the coolant tunnel portions 62 and opens toward the coolant passage 42b.

On the other hand, as shown in FIG. 4, in the extending direction of the coolant tunnel portions 62 provided in the first bipolar plate 48, ends of the coolant tunnel portions 62 near the oxygen-containing gas flow field 52 are closed. Further, in the extending direction of the coolant tunnel portions 62 provided in the second bipolar plate 50 of FIG. 3, ends of the coolant tunnel portions 62 near the fuel gas flow field 56 are closed. Further, ends of the coolant tunnel portions 62 in the coolant side surface 48b of the first bipolar plate 48 near the coolant flow field 60 are connected to the coolant flow field 60 via a gap (not shown) formed between the coolant side surfaces 48b and 50b of the first bipolar plate 48 and the second bipolar plate 50. Ends of the coolant tunnel portions 62 in the coolant side surface 50b of the second bipolar plate 50 near the coolant flow field 60 are connected to the coolant flow field 60 via a gap (not shown) formed between the coolant side surfaces 48b and 50b of the first bipolar plate 48 and the second bipolar plate 50.

Thus, a connection channel for connecting the coolant passages 42a, 42b and the coolant flow field 60 is formed inside each of the coolant tunnel portions 62. The connection channel does not allow the coolant passages 42a to connect to the fluid flow fields F (the oxygen-containing gas flow field 52 and the fuel gas flow field 56) other than the coolant flow field 60. The connection channel does not allow the coolant passages 42b to connect to the fluid flow fields F (the oxygen-containing gas flow field 52 and the fuel gas flow field 56) other than the coolant flow field 60.

In the present embodiment, three coolant tunnel portions 62 are disposed for one coolant passage 42a. Three coolant tunnel portions 62 are disposed for one coolant passage 42b. However, the number of coolant tunnel portions 62 disposed for one coolant passage 42a is not particularly limited. A single coolant tunnel portion 62 may be disposed for one coolant passage 42a. The number of the plurality of coolant tunnel portions 62 disposed for one coolant passage 42a may be other than three. The number of coolant tunnel portions 62 disposed for one coolant passage 42b is not particularly limited. A single coolant tunnel portion 62 may be disposed for one coolant passage 42b. The number of the plurality of coolant tunnel portions 62 disposed for one coolant passage 42b may be other than three.

As shown in FIGS. 6 to 8, the first portion 72 of the rubber seal member R protrudes from the flat portion 76 in the protruding direction. The second portion 74 of the rubber seal member R protrudes in the protruding direction from the protruding end surface Ta of the tunnel portion T disposed at the intersection 78. As shown in FIGS. 6 and 8, the first portion 72 and the second portion 74 extend continuously along the extending direction of the rubber seal member R.

Further, as shown in FIGS. 7A, 7B, and 8, a protruding height H1 of the first portion 72 from the flat portion 76 is constant in the extending direction of the rubber seal member R, and a protruding height H2 of the second portion 74 from the flat portion 76 is constant in the extending direction of the rubber seal member R. That is, the protruding height H1 of the first portion 72 from the flat portion 76 is the same or substantially the same as the sum of a protruding height H3 of the tunnel portion T from the flat portion 76 and a protruding height H4 of the second portion 74 from the protruding end surface Ta of the tunnel portion T.

As shown in FIG. 8, in the intersection 78, side surfaces Tb on both sides in the width direction of the tunnel portion T are in contact with the rubber seal member R. In the present embodiment, the side surfaces Tb on both sides in the width direction of the tunnel portion T are inclined in directions approaching each other as the side surfaces Tb are close to the distal end in the protruding direction. Therefore, the tunnel portion T has a trapezoidal cross-sectional shape along the separator thickness direction. Both side surfaces Tb of the tunnel portion T in the width direction may be along the separator thickness direction. That is, the tunnel portion T may have a square shape or rectangular shape in cross section along the separator thickness direction. Further, the side surfaces Tb on both sides in the width direction of the tunnel portion T may be curved.

The operation of the fuel cell stack 16 (FIG. 1) basically configured as described above will be briefly described. As shown in FIG. 1, in the case of performing power generation in the fuel cell stack 16, a fuel gas is supplied to the fuel gas supply passage 44a, an oxygen-containing gas is supplied to the oxygen-containing gas supply passage 40a, and a coolant is supplied to the coolant supply passages 42a.

As shown in FIG. 4, the oxygen-containing gas flows from the oxygen-containing gas supply passage 40a into the oxygen-containing gas flow field 52 through the connection channels in the oxygen-containing gas tunnel portions 54. While the oxygen-containing gas moves along the oxygen-containing gas flow field 52 in the direction indicated by the arrow B, the oxygen-containing gas is supplied to the cathode 38 of the resin frame equipped MEA 28. On the other hand, as shown in FIG. 5, the fuel gas flows from the fuel gas supply passage 44a into the fuel gas flow field 56 through the connection channels in the fuel gas tunnel portions 58. While the fuel gas moves along the fuel gas flow field 56 in the direction indicated by the arrow B, the fuel gas is supplied to the anode 36 of the resin frame equipped MEA 28.

Therefore, in each of the resin frame equipped MEAs 28, the oxygen-containing gas and the fuel gas are partially consumed in electrochemical reactions, in the cathode catalyst layer 38a and the anode catalyst layer 36a. Thus, power generation is performed.

The oxygen-containing gas which has not been consumed in the electrochemical reactions (oxygen-containing exhaust gas) flows from the oxygen-containing gas flow field 52 into each of the oxygen-containing gas discharge passages 40b through the connection channels in the oxygen-containing gas tunnel portions 54. The oxygen-containing gas (oxygen-containing exhaust gas) flowing into the oxygen-containing gas discharge passages 40b flows through the oxygen-containing gas discharge passages 40b in the direction indicated by the arrow A, and is discharged from the fuel cell stack 16. Similarly, the fuel gas (fuel exhaust gas) that has not been consumed by the electrochemical reactions flows from the fuel gas flow field 56 into the fuel gas discharge passages 44b through the connection channels in the fuel gas tunnel portions 58. The fuel gas (fuel exhaust gas) flowing into the fuel gas discharge passages 44b flows through the fuel gas discharge passages 44b in the direction indicated by the arrow A, and is discharged from the fuel cell stack 16.

As shown in FIG. 3, the coolant flows from the coolant supply passages 42a into the coolant flow field 60 through the connection channels in the coolant tunnel portions 62. While the coolant flowing into the coolant flow field 60 moves along the coolant flow field 60 in the direction indicated by the arrow B, heat exchange with the resin frame equipped MEA 28 is performed. The coolant after heat exchange flows into the coolant discharge passages 42b through the connection channels in the coolant tunnel portions 62. The coolant flowing into the coolant discharge passages 42b flows through the coolant discharge passages 42b in the direction indicated by the arrow A, and is discharged from the fuel cell stack 16.

In the fuel cell separator 10 according to the present embodiment, as described above, the rubber seal member R and the tunnel portion T are different members. The rubber seal member R provides a seal between the fluid flow field F and the fluid passage H. The tunnel portion T forms a connection channel that connects the fluid flow field F and the fluid passage H. For this reason, in the intersection 78 to which the compression load is applied, for example, compared to a case where the rubber seal member R and the tunnel portion T are continuously formed of the same member, it is possible to prevent the rubber seal member R and the tunnel portion T from being elastically deformed together or integrally.

That is, the rubber seal member R can be elastically deformed by the compression load sufficiently. Thus, it is possible to achieve good seal performance between the fluid flow field F and the fluid passage H. On the other hand, in the tunnel portion T, even if a compression load is applied thereto, it is possible to maintain a shape in which a connection channel having a sufficient cross-sectional area is formed inside. Thus, it is possible to allow the fluid to flow between the fluid flow field F and the fluid passage H in a favorable manner.

As described above, in the separator 10 and the fuel cell stack 16 including the separator 10 according to the present embodiment, it is possible to achieve good seal performance between the fluid flow field F and the fluid passage H. Further, it is possible to allow the fluid to flow through the connection channel in the tunnel portion T in a favorable manner.

In the fuel cell separator 10 according to the above-described embodiment, the protruding height H1 of the first portion 72 from the flat portion 76 is constant in the extending direction of the rubber seal member R, and the protruding height H2 of the second portion 74 from the flat portion 76 is constant in the extending direction of the rubber seal member R.

In this case, it is possible to apply a linear pressure to the distal end surface Ra of the rubber seal member R by the compression load, uniformly in the extending direction of the rubber seal member R. As a result, the linear pressure can be easily applied to the entire rubber seal member R without excess or deficiency, so that it is possible to achieve better seal performance by the rubber seal member R. The linear pressure herein means an average value of the linear pressure applied to the distal end surface Ra of the rubber seal member R by the compression load, per unit length in the extending direction of the rubber seal member R.

The protruding height H1 of the first portion 72 from the flat portion 76 and the protruding height H2 of the second portion 74 from the flat portion 76 may be different from each other. For example, the protrusion height H1 of the second portion 74 from the flat portion 76 may be higher than the protrusion height H2 of the first portion 72 from the flat portion 76.

In the fuel cell separator 10 according to the above-described embodiment, one pair of a plurality of (two) rubber seal members R are arranged in parallel in the separator surface direction.

In this case, for example, in the fuel cell stack 16, even if the relative positions of the power generation cells 12 are shifted in the separator surface direction, it is easy to maintain a state in which any of the plurality of rubber seal members R is arranged so as to overlap in the stacking direction with any of the plurality of rubber seal members R of the adjacent separator 10. As a result, it is possible to achieve better seal performance by the rubber seal members R between the fluid flow field F and the fluid passage H. In addition, by using a plurality of rubber seal members as one pair or set, it is possible to prevent an excessive increase in the linear pressure applied to each rubber seal member R. Thus, for example, the durability of the rubber seal member R can be increased. As a result, it is possible to easily achieve seal performance between the fluid flow field F and the fluid passage H.

Figure 9A:
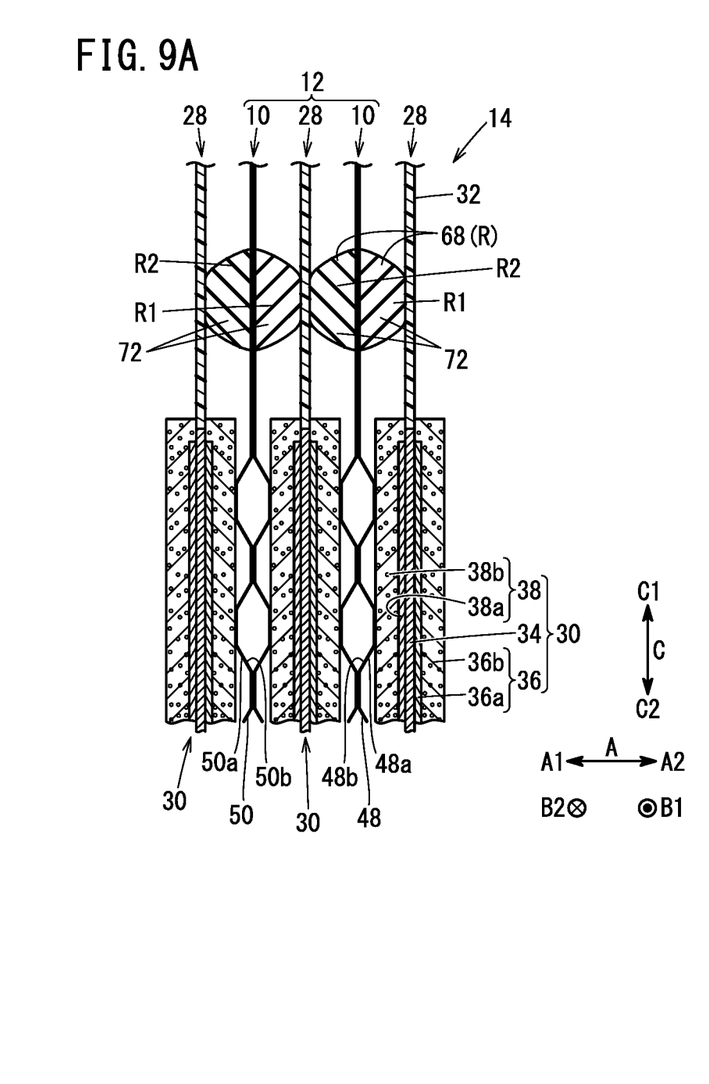
FIGS. 9A and 9B are partial cross-sectional views of a cell stack body taken along line II-II of FIG. 1, for illustrating a rubber seal member according to a modification.

In the above-described embodiment, an example has been described of a case in which one pair (double lip) of two rubber seal members R are arranged in parallel in the separator surface direction. However, one set of three or more rubber seal members R may be arranged in parallel in the separator surface direction. Further, as shown in FIG. 9A, only one (single lip) rubber seal member R may be provided.

In the intersection 78 of the fuel cell separator 10 according to the above-described embodiment, the side surfaces Tb rising from the flat portion 76 at both ends in the width direction of the tunnel portion T are in contact with the rubber seal member R.

The compression load is applied in the stacking direction (the protruding direction of the tunnel portion T). For this reason, in the tunnel portion T to which the above-mentioned compression load is applied, the protruding end surface Ta is directed toward the inside of the connection channel along the stacking direction, and stresses are likely to be generated in the directions in which the side surfaces Tb are directed toward the outside in the width direction of the connection channel. However, the rubber seal member R is in contact with the side surfaces Tb of the tunnel portion T. Therefore, even if the above-described stresses are generated, deformation of the tunnel portion T is prevented. Further, since the cross-sectional area of the connection channel in the tunnel portion T can be maintained, it is possible to allow the fluid to flow through the connection channel.

The present invention is not limited to the embodiments described above, and various additional or modified structures could be adopted therein without deviating from the gist of the present invention.

Figure 9B:
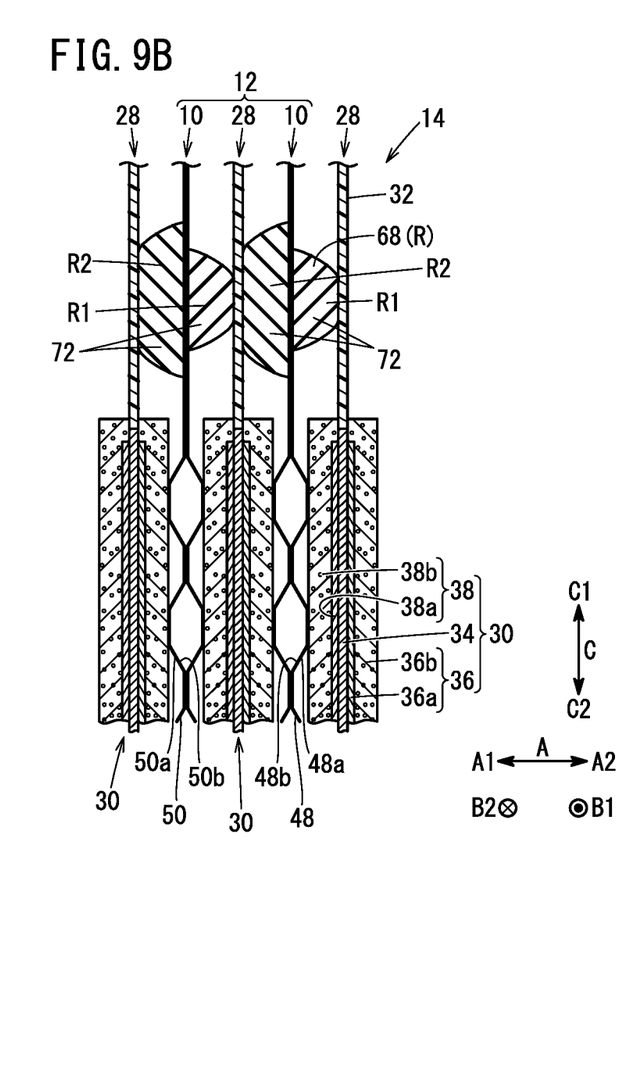

For example, in the fuel cell stack 16 according to the above-described embodiment, the shape and size of the first rubber seal member R1 and the shape and size of the second rubber seal member R2 are determined to be the same or substantially the same, but the present invention is not particularly limited thereto. For example, as shown in the drawing 9B, the width of the first rubber seal member R1 may be determined to be smaller than the width of the second rubber seal member R2.

In FIG. 9B, only one (single lip) first rubber seal member R1 is provided. Also, only one (single lip) first rubber seal member R2 is provided. The width of the first rubber seal member R1 is different from the width of the second rubber seal member R2. However, the two (double lip), or three or more first rubber seal members R1 may be provided. The two (double lip), or three or more second rubber seal member R2 may be provided. Even in these cases, the width of each of the first rubber seal members R1 may be different from the width of each of the second rubber seal members R2. Although not illustrated, the width of the first rubber seal member R1 may be determined to be smaller than the width of the second rubber seal member R2.

Further, for example, even in a case where the width of the first rubber seal member R1 and the width of the second rubber seal member R2 are the same in one separator 10, the widths of the rubber seal members R may be different between the adjacent separators 10 in the stacking direction.

That is, in the fuel cell stack 16, the rubber seal members R provided in each of the separators 10 stacked in the stacking direction may be arranged so as to overlap in the stacking direction. The rubber seal members R adjacent to each other in the stacking direction may have different widths perpendicular to the extending direction of the rubber seal members R.

In this case, for example, in the fuel cell stack 16, even if the relative positions of the power generation cells 12 are shifted in the separator surface direction, it is possible to easily maintain a state in which the resin frame member 32 is interposed between the rubber seal members R of the adjacent separators 10 that face each other. Thus, it is possible to easily maintain a state in which an appropriate linear pressure is applied to the distal end surface Ra of each rubber seal member R. As a result, it is possible to achieve better seal performance by the rubber seal member R between the fluid flow field F and the fluid passage H.

What is claimed is:

1. A fuel cell separator stacked on an membrane electrode assembly, a compression load being applied to the fuel cell separator in a stacking direction, the fuel cell separator comprising:
a fluid flow field configured to allow a fluid that is any of an oxygen-containing gas, a fuel gas, and a coolant to flow in a separator surface direction;
a fluid passage that penetrates, in the stacking direction, an outer area disposed outside the fluid flow field in the separator surface direction and is configured to allow the fluid to flow in the stacking direction;
a rubber seal member configured to provide a seal between the fluid flow field and the fluid passage; and
a tunnel portion that has a hollow shape protruding in the stacking direction from a flat portion provided in the outer area, extends so as to intersect the rubber seal member at an intersection, and forms inside a connection channel configured to connect the fluid flow field and the fluid passage,
wherein the rubber seal member is a member different from the tunnel portion and includes a first portion and a second portion that extend continuously with each other,
the first portion protrudes in the stacking direction from the flat portion, and
the second portion protrudes in the stacking direction from a protruding end surface of the tunnel portion disposed at the intersection.

2. The fuel cell separator according to claim 1, wherein a protruding height of the first portion from the flat portion is constant in an extending direction of the rubber seal member, and a protruding height of the second portion from the flat portion is constant in the extending direction of the rubber seal member.

3. The fuel cell separator according to claim 1, wherein a plurality of the rubber seal members are arranged in parallel in the separator surface direction, as one set.

4. The fuel cell separator according to claim 1, wherein at the intersection, side surfaces on both sides in a width direction of the tunnel portion are in contact with the rubber seal member.

5. A fuel cell stack in which a plurality of fuel cell separators and a plurality of membrane electrode assemblies are stacked in a stacking direction,
wherein a compression load is applied to the fuel cell separators in the stacking direction of the fuel cell separators and the membrane electrode assemblies,
the fuel cell separator comprises:
a fluid flow field configured to allow a fluid that is any of an oxygen-containing gas, a fuel gas, and a coolant to flow in a separator surface direction;
a fluid passage that penetrates, in the stacking direction, an outer area disposed outside the fluid flow field in the separator surface direction and is configured to allow the fluid to flow in the stacking direction;
a rubber seal member configured to provide a seal between the fluid flow field and the fluid passage; and
a tunnel portion that has a hollow shape protruding in the stacking direction from a flat portion provided in the outer area, extends so as to intersect the rubber seal member at an intersection, and forms inside a connection channel configured to connect the fluid flow field and the fluid passage, and
wherein the rubber seal member is a member different from the tunnel portion and includes a first portion and a second portion that extend continuously with each other,
the first portion protrudes in the stacking direction from the flat portion, and the second portion protrudes in the stacking direction from a protruding end surface of the tunnel portion disposed at the intersection.

6. The fuel cell stack according to claim 5, wherein in the separator, a protruding height of the first portion from the flat portion is constant in an extending direction of the rubber seal member, and a protruding height of the second portion from the flat portion is constant in the extending direction of the rubber seal member.

7. The fuel cell stack according to claim 5, wherein a plurality of the rubber seal members are arranged in parallel in the separator surface direction, as one set.

8. The fuel cell stack according to claim 5, wherein at the intersection, side surfaces on both sides in a width direction of the tunnel portion are in contact with the rubber seal member.

9. The fuel cell stack according to claim 5, wherein the rubber seal members provided on the plurality of fuel cell separators stacked in the stacking direction are arranged so as to overlap in the stacking direction, and
the rubber seal members adjacent to each other in the stacking direction have different widths in a direction perpendicular to an extending direction of the rubber seal members.

* * * * *